US005897060A

United States Patent [19]

Kon et al.

[11] Patent Number: 5,897,060

[45] Date of Patent: Apr. 27, 1999

[54] ROTARY ATOMIZING HEAD ASSEMBLY

[75] Inventors: Masatoshi Kon; Hidetsugu Matsuda, both of Tokyo, Japan

[73] Assignee: ABB Industry K.K., Tokyo, Japan

[21] Appl. No.: 08/894,705

[22] PCT Filed: Dec. 19, 1996

[86] PCT No.: PCT/JP96/03695

§ 371 Date: Aug. 28, 1997

§ 102(e) Date: Aug. 28, 1997

[87] PCT Pub. No.: WO97/24188

PCT Pub. Date: Jul. 10, 1997

[30] Foreign Application Priority Data

Dec. 28, 1995 [JP] Japan .................................... 7-354060

[51] Int. Cl.[6] ................................ B05B 5/00; B05B 3/10; F16L 39/00

[52] U.S. Cl. .......................... 239/223; 239/224; 239/700; 239/703; 285/321

[58] Field of Search .................................... 239/223, 224, 239/703, 700; 285/321

[56] References Cited

U.S. PATENT DOCUMENTS 3,637,239 1/1972 Daniel ................................ 285/321 X
4,407,482 10/1983 Daghe et al. ........................ 285/321 X
4,781,487 11/1988 Greco .................................. 285/321 X
5,080,521 1/1992 Quaile ................................ 285/321 X

*Primary Examiner*—Andres Kashnikow
*Assistant Examiner*—Sean P. O'Hanlon
*Attorney, Agent, or Firm*—Oblon, Spivak, McClelland, Maier & Neustadt, P.C.

[57] ABSTRACT

A rotary atomizing head assembly employing a main body and a hub member which can be easily disassembled and reassembled whenever necessary. A ring engaging surface is provided on the inner peripheral side of a recessed hub socket on the main body, while a ring fitting groove is provided on the outer peripheral side of a cylindrical body portion of the hub member. With an O-ring set in the ring fitting groove, the cylindrical body portion of the hub member is fitted into the recessed hub socket, whereupon the hub member is resiliently retained on the main body of the rotary atomizing head by resilient retaining force of the O-ring. In this instance, the O-ring is pressed against the ring engaging surface to prevent dislocation of the hub member. On the other hand, the hub member can be disassembled from the main body by pulling the hub member in the axial direction to such a degree as to cause elastic deformation to the O-ring.

11 Claims, 10 Drawing Sheets

ROTARY ATOMIZING HEAD ASSEMBLY

This is a U.S. National Stage Application based on International PCT Application PCT/JP96/03695 filed Dec. 19, 1996.

TECHNICAL FIELD

This invention relates to a rotary atomizing head assembly particularly suitable for use on paint coating machines, for example, on paint coating machines of the sort which are employed in manufacturing processes of automobile or other vehicular bodies or the like.

BACKGROUND ART

It has been well known in the art to provide a rotary atomizing head on paint coating machines of the sort as mentioned above. Generally, in rotary atomizing heads, a paint is supplied to a cylindrical or bell-shaped main body which is put in high speed rotation for atomizing and spraying the paint toward an object to be coated. By way of example, a couple of prior art paint coating machines with a bell type rotary atomizing head (hereinafter referred to as "rotary atomizing head type paint coating machines" for the convenience of explanation) are shown in the drawings.

Shown in FIG. 16 is a first prior art rotary atomizing head 100 which is mounted on a paint coating machine. The rotary atomizing head 100 is largely constituted by a main body 101, and a hub member 102 which is located within the main body 101 and securely fixed to the latter by means of set screws 103. Indicated at 104 is a housing of the paint coating machine, and at 105 is a rotational shaft which supports the atomizing head 100. Through a paint feed tube 106, a paint is supplied to the rotary atomizing head 100 which is supported at the fore end of the rotational shaft 105.

Shown in FIG. 17 is a second prior art rotary atomizing head 200 which is mounted on a paint coating machine. Similarly, this rotary atomizing head 200 is largely constituted by a main body 201 and a hub member 202 which is mounted within the main body 201 and securely fixed to the latter by means of a rear screw portion 203. Denoted at 204 is a housing of the paint coating machine and at 205 is a rotational shaft which supports the atomizing head 200. A paint is supplied to the atomizing head 200 at the fore end of the rotational shaft 205 by way of a paint feed tube 206 which is extended axially through the rotational shaft 205.

In some cases, more particularly, in coating operations using paints of different colors, the rotary atomizing heads of this sort need to be dismantled and disassembled for washing them clean and reassembled each time when changing the paint color.

In this regard, the hub member 102 in the above-described first prior art rotary atomizing head 100 is fixed to the main body 101 by means of set screws 103, while the hub member 202 in the second prior art rotary atomizing head 200 is fixed to the main body 201 by threaded engagement therewith of the screw portion 203. Accordingly, whenever there arises a necessity for washing the rotary atomizing head 100 or 200 clean, the hub member 102 or 202 need to be disassembled from and reassembled with the atomizing head body 101 or 201 by loosening and tightening the set screws 103 or the screw portion 203 before and after washing. However, a problem with the above-described prior art rotary atomizing heads has been that the disassembling and reassembling jobs require a tool for loosening and tightening the screws 103 or the screw portion 203 and usually take a long time.

Besides, in most of rotary atomizing head type paint coating machines which are currently in use, the rotary atomizing head is put in high speed rotation of 20,000 r.p.m. or higher to produce higher atomization effects on the spray of paint particles, so that meticulous skills are required in setting the rotary atomizing head precisely in a rotationally balanced state substantially free of radial run-outs in high speed rotation.

In this regard, in case a hub member 102 and 202 is detachably or separably fixed to a main body 101 and 201 in the above-described prior art, the rotary atomizing head could lose rotational balances depending upon the degree of tightening of a screw or screws in a reassembling process even if the rotary atomizing head 100 and 200 were once set in a rotationally balanced state. Therefore, the rotary atomizing heads as in the above-mentioned prior art constructions 100 and 200 give rise to another problem that a great deal of time and cost has to be spent for checking and readjusting rotational balances.

In this connection, it may be conceivable to maintain initial rotational balances of a rotary atomizing head by inseparably fixing a main body and a hub member to each other by the use of pins or by press-fitting. In such a case, however, it will require toiling efforts to wash off paint deposits which persistently remain in solidified state on various parts of the rotary atomizing head.

In view of the problems inherent to the prior art, it is an object of the present invention to provide a rotary atomizing head assembly which can be easily disassembled, washed and reassembled, and yet which can easily restore rotational balances after reassembling.

DISCLOSURE OF THE INVENTION

In accordance with the present invention, the above-stated objective is achieved by the provision of a rotary atomizing head assembly which comprises: a main body formed in a cylindrical or bell-like shape including a rear neck portion to be mounted on a rotational shaft, a front portion having a paint film forming surface on the inner periphery thereof toward fore paint releasing edges, and a recessed hub socket formed in the depths of the paint film forming surface; a hub member in the form of a lidded cylinder including a lid portion having a paint receiving surface on the rear side thereof, a cylindrical body portion extending rearward from the lid portion and detachably fitted in the recessed hub socket, and paint outlet holes for letting a paint flow out to the paint film forming surface of the main body from the paint receiving surface; a ring fitting groove provided on one of two opposing surfaces of an inner peripheral surface of said recessed hub socket on the main body and an outer peripheral surface of the hub member; a resilient ring placed in the ring fitting groove to hold the hub member detachably in the recessed hub socket by a resilient force when the cylindrical body portion of the hub member is fitted into the recessed hub socket on the main body; and a ring engaging surface provided on the other one of said two opposing surfaces in confronting relation with the ring fitting groove and engageable with the resilient ring holding the hub member against dislocation out of the recessed hub socket.

With the arrangements just described, upon fitting the cylindrical body portion of the hub member in the hub socket on the atomizing head body, the resilient ring which is set in the ring fitting groove is caused to undergo elastic deformation between the recessed hub socket and the cylindrical body portion of the hub member to produce a resilient force which holds the cylindrical body portion of the hub member against dislocation from its position on the main body of the rotary atomizing head. Therefore, the main body and the hub member can be disassembled or reassembled easily without using any tool in particular. Nevertheless, once the cylindrical body portion of the hub member is fitted in the recessed hub socket on the main body, it can be securely stopped in position by a resistive force of the resilient ring. In addition, thanks to the resilient ring which holds the cylindrical body portion of the hub member resiliently in the hub socket on the main body, the rotational center axis of the hub member is urged into alignment with the rotational center axis of the main body when the rotary atomizing head is put in high speed rotation.

In this instance, according to the present invention, the ring engaging surface may be provided as an inclined surface on the inner periphery of the recessed hub socket between an annular groove of increased diameter and an inner peripheral surface of the hub socket. Alternatively, the ring engaging surface may be constituted by an inclined surface which is provided on the outer periphery of the hub member between an annular groove of reduced diameter and an outer peripheral surface of the hub member.

With the arrangements just described, upon fitting the cylindrical body portion of the hub member into the recessed hub socket on the main body of the rotary atomizing head, the resilient ring is urged into engagement with the annular groove and pressed against the inclined ring engaging surface to prevent dislocation of the hub member by its resilient resistive force.

Further, according to the present invention, the recessed hub socket on the main body of the rotary atomizing head may be provided with a beveled bottom surface which is inclined toward its rotational axis, while the cylindrical body portion of the hub member is provided with a beveled rear end face inclined complementarily relative to the beveled bottom surface of the recessed hub socket.

With the arrangements just described, upon fitting the cylindrical body portion of the hub member into the recessed hub socket on the main body to bring the beveled rear end face of the cylindrical body portion into abutting engagement with the beveled bottom surface of the hub socket, the hub member can be automatically oriented toward and located in a concentrically aligned position on the main body of the rotary atomizing head.

Further, according to the present invention, the recessed hub socket of the main body may be provided with a beveled inner peripheral surface inclined toward the rotational axis thereof and, while the cylindrical body portion of the hub member is provided with a beveled outer peripheral surface inclined complementarily relative to the beveled inner peripheral surface of the hub socket.

With the arrangements just described, upon fitting the cylindrical body portion of the hub member into the recessed hub socket on the main body to bring the beveled surface on the outer periphery of the hub member into abutting engagement with the beveled surface on the inner periphery of the hub socket, the hub member can be automatically oriented toward and located in a concentrically aligned position on the main body of the rotary atomizing head.

On the other hand, according to the present invention, the ring fitting groove may be provided on an outer peripheral surface of the cylindrical body portion of the hub member, while a ring engaging surface is provided on the inner periphery of the recessed hub socket of the main body. Alternatively, the ring fitting groove may be provided on an inner peripheral surface of the recessed hub socket of the main body,while a ring engaging surface is provided on the outer periphery of the cylindrical body portion of the hub member.

In this regard, according to the present invention, a ring fitting groove is provided on an outer peripheral surface of its cylindrical body portion of the hub member, a ring engaging surface is provided on an inner peripheral surface of the recessed hub socket of the main body, said recessed hub socket is provided with a beveled bottom surface which is inclined toward its rotational axis, and the cylindrical portion of the hub member is provided with a beveled end surface inclined complementarily relative to beveled bottom surface of the recessed hub socket.

Alternatively, according to the present invention a ring fitting groove is provided on an inner peripheral surface of the recessed hub socket on the main body, the ring engaging surface is provided on an outer peripheral surface of the cylindrical body portion the hub member, the recessed hub sockets provided with a beveled bottom surface inclined toward its rotational axis, and cylindrical body portion of a hub member is provided with a beveled end face inclined complementarily relative to said beveled bottom surface of the hub socket.

Further, according to the present invention, a ring fitting groove is provided on an outer peripheral surface of its cylindrical body portion of the hub member, the ring engaging surface is provided on an inner peripheral surface of the recessed hub socket on the main body, said recessed hub socket is provided with a beveled inner peripheral surface inclined toward its rotational axis, and the cylindrical body portion of the hub member is provided with a beveled outer peripheral surface inclined complementarily relative to the beveled inner peripheral surface of the hub socket.

Alternatively, according to the present invention, the ring fitting groove is provided on an inner peripheral of the recessed hub socket on the main body, the ring engaging surface is provided on an outer peripheral surface on the hub member, the recessed hub socket is provided with a beveled inner peripheral surface inclined toward the rotational axis thereof, the cylindrical portion of the hub member is provided with a beveled outer peripheral surface inclined complementarily relative to the beveled inner peripheral surface of the hub socket.

Furthermore, the present invention may be constituted by a combination of: a main body formed in a cylindrical or bell-like shape including a rear neck portion to be mounted on a rotational shaft, a front portion having a paint film forming surface on the inner periphery thereof toward fore paint releasing edges, and a recessed hub socket formed in the depths of the paint film forming surface; a hub member in the form of a lidded cylinder including a lid portion having a paint receiving surface on the rear side thereof, a cylindrical body portion extending rearward from the lid portion and detachably fitted in the recessed hub socket, and paint outlet holes for letting a paint flow out to the paint filming surface of the main body from the paint receiving surface, flow out onto the paint film forming surface of the main body; a ring fitting groove provided either on an inner peripheral surface of the recessed hub socket on the main body or on an outer peripheral surface of the hub member; and a resilient ring fittingly placed in the ring fitting groove to hold the hub member detachably in the recessed hub socket by a resilient force when the cylindrical body portion of the hub member is fitted into the recessed hub socket on the main body.

BEST MODE FOR CARRYING OUT THE INVENTION

Hereafter, the invention is described more particularly by way of its preferred embodiments with reference to the accompanying drawings.

Figure 1:
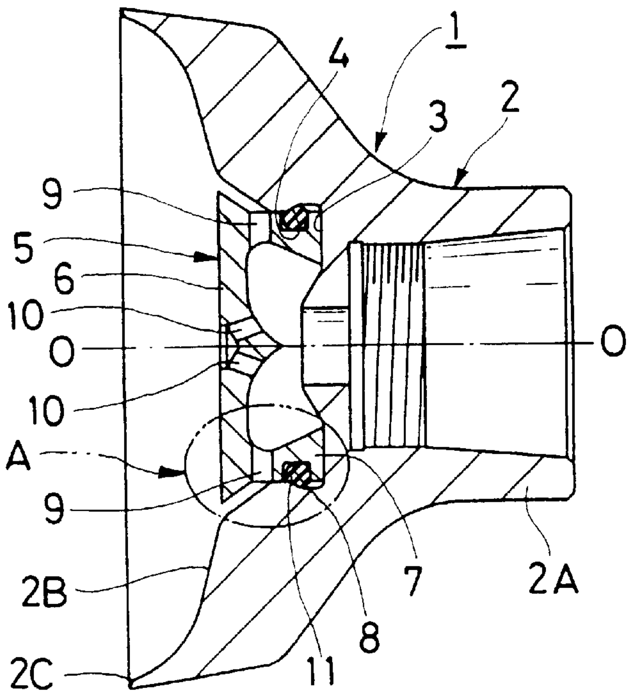
FIG. 1 is a sectional view of a rotary atomizing head assembly adopted as a first embodiment of the invention.
Figure 2:
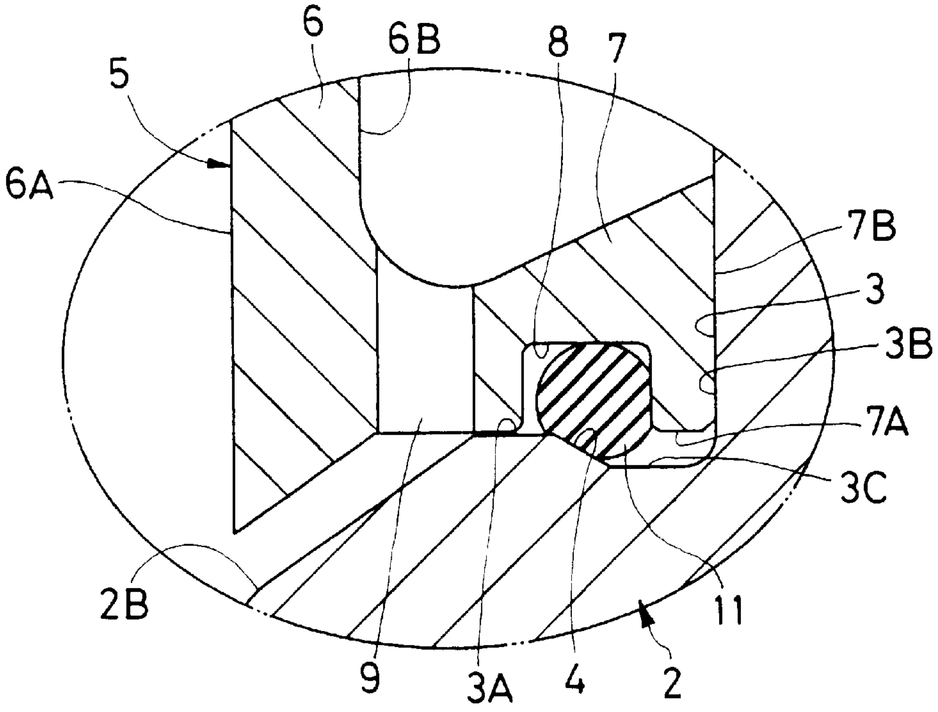
FIG. 2 is an enlarged sectional view of a portion indicated by arrow A in FIG. 1.
Figure 3:
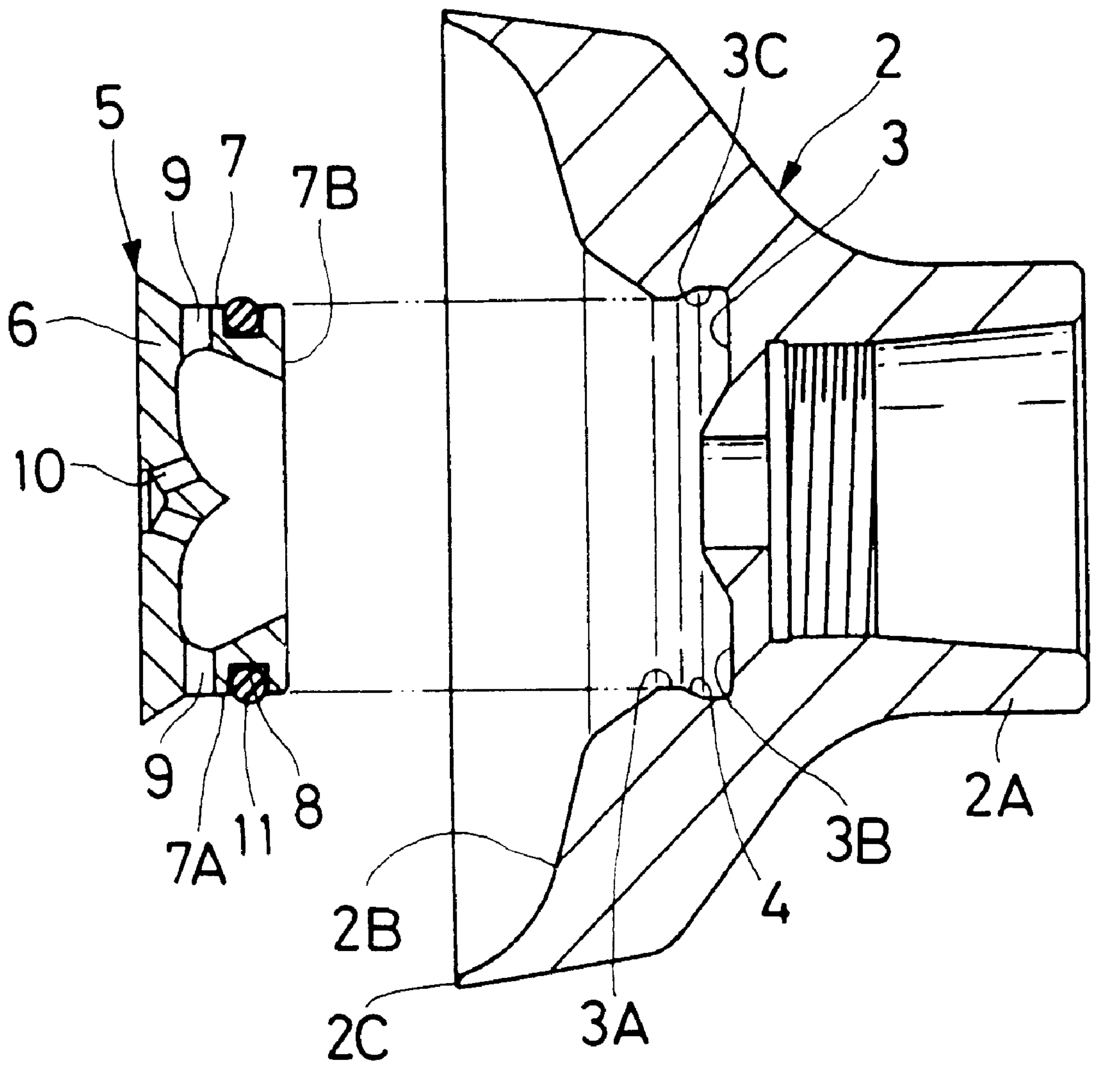
FIG. 3 is a sectional view of a main body and a hub member of the rotary atomizing head in a disassembled state.

Referring first to FIGS. 1 to 3, there is shown a first embodiment of the present invention, wherein indicated at 1 is a rotary atomizing head assembly of this embodiment which is constituted by a main body 2, a hub member 5 and an O-ring 11 as will be-described in detail hereinafter.

The main body 2 which defines an outer configuration of the rotary atomizing head assembly 1, is provided with a rotational axis O—O, and formed in a bell-like shape as a whole including a rear neck portion 2A to be threaded on a rotational shaft (not shown) and a forwardly enlarging front portion. Provided on the inner periphery of the front portion of the main body 2 is a paint film forming surface 2B of a forwardly enlarging shape extending continuously toward paint releasing edges 2C at the fore terminal end of the main body 2. When the rotary atomizing head 1 is put in high speed rotation, a paint which is supplied onto the paint film forming surface 2B through first hub holes 9, which will be described hereinafter is spread into a thin film and released forward in the form of liquid threads from the above-mentioned paint releasing edges 2C. The released liquid threads of paint are atomized and sprayed in the form of fine particles.

Indicated at 3 is a recessed hub socket which is positioned at the depth of the paint film forming surface 2B and is formed at the inside of the main body 2 concentrically around the rotational center axis O—O. As shown particularly in FIG. 2, the recessed hub socket 3 is in the shape of a blind cave which is open only on the front side, and defined by an inner peripheral surface 3A and a bottom surface 3B. The inside diameter of the recessed hub socket 3, which is determined by its inner peripheral surface 3A, is slightly larger than the outside diameter of a cylindrical body portion 7 of the hub member 5 which will be described hereinafter. The recessed hub socket 3 is provided with an annular groove 3C of increased diameter on its inner peripheral surface 3A at a position closer to its bottom surface 3B, defining between the annular groove 3C and the inner peripheral surface 3A an inclined or beveled ring engaging surface 4 as will be described below.

The ring engaging surface 4, which is provided on the inner peripheral surface 3A of the hub socket 3, is located between the inner peripheral surface 3A and the annular groove 3C with an increased inside diameter, and in the form of a beveled surface divergingly inclined gradually toward the rear side (toward the bottom surface 3B) of the main body. Consequently, when the O-ring 11 is pressed against the inclined or beveled ring engaging surface 4, the cylindrical body portion 7 of the hub member 5 is pushed toward the bottom surface 3B by resilient force of the O-ring 11, and thereby held in position within the recessed hub socket 3 free of dislocation therefrom.

The hub member 5 is formed in the main body 2 in a concentrically aligned position relative to the rotational center axis O—O, and in the form of a lidded cylinder including a substantially flat plate-like lid portion 6 which is located at its fore end and a cylindrical body portion 7 which is extended rearward contiguously from the circumference of the lid portion 6.

In this instance, the lid portion 6 is provided with a flat front face 6A on the front side and a paint receiving surface 6B on the rear or inner side which receives a supply of paint from a paint feed tube (not shown) while supplying the received paint to the paint film forming surface 2B on the main body 2 of the atomizing head. The afore-mentioned cylindrical body portion 7 is provided with an outer peripheral surface 7A to be held in small gap relation with the inner peripheral surface 3A of the hub socket 3 when fitted in the latter, and a rear end face 7B to be abutted against the bottom surface 3B of the hub socket 3.

Denoted at 8 is an annular ring fitting groove which is provided on the outer peripheral surface 7A of the cylindrical body portion 7 of the hub member 5, in a position confronting face to face with the ring engaging surface 4. An O-ring 11 is fitted in the ring fitting groove 8 as will be described in greater detail below.

Indicated at 9 are the first hub holes providing a large number of paint outlet holes radially through the cylindrical body portion 7 of the hub member 5 at positions immediately behind the lid portion 6 (only two of the first hub holes are shown in the drawing). Through these first hub holes 9, a paint which is spouted to the paint receiving surface 6B from the paint feed tube is allowed to flow out to the paint film forming surface 2B of the main body 2 of the rotary atomizing head.

Indicated at 10 are second hub holes providing a large number of paint outlets at the center of the lid portion 6 (only two of the second hub holes are shown in the drawing). These second hub holes 10 are bored in such a manner as to intercommunicate the paint receiving surface 6B and front face 6A of the lid portion 6. A thinner or other cleaning liquid is supplied to the front surface 6A through the second hub holes 10 at the time of washing the front face 6A to remove paint deposits therefrom. Namely, the second hub holes 10 are provided exclusively for the purpose of washing the front face 6A of the lid portion 6, and may be omitted, if unnecessary.

Denoted at 11 is a resilient O-ring which is placed in the ring fitting groove 8 on the outer periphery of the cylindrical body portion 7. The O-ring 11 has a body of a circular shape in section and formed of a resilient material like rubber. The resilient O-ring 11 is formed in such diameter and size that it will partly protrude out of the ring fitting groove 8 when in the fitted position shown.

As the cylindrical body portion 7 of the hub member 5 is pushed into the recessed hub socket 3 on the main body 2 of the atomizing head, the O-ring 11 in the ring fitting groove 8 is once squeezed into the groove 8 through elastic deformation to permit insertion of the cylindrical body portion 7, and then pressed against the ring engaging surface 4 to hold the hub member 5 securely within the recessed hub socket 3 by its resilient force. Besides, the O-ring 11 which holds the hub member 5 resiliently in the hub socket 3 serves to suppress or minimize positional deviations of the hub member 5 relative to the rotational axis (the axis O—O) of the main body 2.

The rotary atomizing head assembly 1 of the present embodiment, with the arrangements just described above, operates in the manner as follows.

Firstly, in an operation for coating a paint on a work, while rotationally driving the rotary atomizing head 1 through the rotational shaft, a paint is supplied to the paint receiving surface 6B of the hub member 5 through a paint feed tube. The paint which has been supplied to the paint receiving surface 6B is caused to flow out to the paint film forming surface 2B through the first hub holes 9 under the influence of centrifugal force. After being formed into a uniform thin film on the paint film forming surface 2B, the paint is sprayed forward in the form of liquid threads from the paint releasing edges 2C and atomized into particles for deposition on the work.

On the other hand, in case of changing the color of paint, a thinner is supplied to the rotary atomizing head 1 in place of a paint, letting the thinner flow out through the first hub holes 9 to wash away paint deposits on the paint film forming surface 2B and paint releasing edges 2C of the atomizing head body 2, and at the same time through the second hub holes 10 to wash and clean the front face 6A of the lid portion 6.

Thereafter, for perfection of washing of the rotary atomizing head assembly 1, for example, the hub member 5 can be disassembled from and reassembled with the main body 2 in the manner as described below.

Firstly, in order to disassemble the rotary atomizing head 1, the hub member 5 is pushed outward (pulled) toward the front side against the resilient force of the O-ring 11. By so doing, the O-ring 11 is resiliently deformed to such a degree that one can forcibly extract the cylindrical body portion 7 of the hub member 5 out of the recessed hub socket 3 on the main body 2.

Nextly, for reassembling the rotary atomizing head 1 after washing the main body 2, hub member 5 and O-ring 11, respectively, the O-ring 11 is firstly placed in the ring fitting groove 8 on the hub member 5. Then, the cylindrical body portion 7 is placed in the recessed hub socket 3 on the main body 2 and, in this state, the hub member 5 is pressed against the main body 2, whereupon the cylindrical body portion 7 is fitted into the hub socket 3 through elastic deformation of the O-ring 11. Upon fitting the hub member 5 in this manner, the O-ring 11 is pressed against the ring engaging surface 4 which as a result tends to push the O-ring 11 toward the bottom surface 3B of the recessed hub socket 3. Accordingly, the hub member 5 is securely retained in the recessed hub socket 3 with the rear end face 7B of its cylindrical body portion 7 pressed against the bottom surface 3B of the hub socket 3 in such a way as to preclude any possibilities of coming off the main body 2, thanks to the resilient force of the O-ring 11 resisting against axial forces which tend to pull the hub member 5 out of the hub socket 3.

Besides, the O-ring 11, which serves to hold the hub member 5 resiliently in the recessed hub socket 3, also contributes to minimize positional deviations of the hub member 5 from the rotational axis (the axis O—O) of the main body 2 and to maintain rotational balances even when the rotary atomizing head 1 is put in high speed rotation.

Thus, according to this embodiment, the O-ring 11 of a resilient material such as rubber is fitted in the ring fitting groove 8, which is formed around the circumference of the cylindrical body portion 7 of the hub member 5, while the cylindrical body portion 7 of the hub member 5 is fitted and retained in the recessed hub socket 3 on the main body 2 of the rotary atomizing head through the O-ring 11. Therefore, this embodiment makes it possible to mount and dismantle the hub member 5 on and off the main body 2 of the rotary atomizing head virtually by one-touch action, without necessitating to loosen and tighten a number of screws as in the prior art constructions mentioned hereinbefore.

The above-described arrangements, which facilitate disassembling and reassembling of the rotary atomizing head assembly 1, also contribute to enhance the efficiency of assembling operations in a fabrication process as well as the production efficiency of the rotary atomizing head assembly itself. In addition, whenever there arises a necessity for washing the rotary atomizing head assembly 1 elaborately, it can be easily disassembled to wash off and remove paint deposits from every corner of its structures efficiently in a facilitated manner.

When the cylindrical body portion 7 of the hub member 5 is fitted in the recessed socket 3 on the main body 2, the O-ring 11 is pressed against the ring engaging surface 4 and therefore the hub member 5 is constantly pushed toward the bottom surface 3B of the recessed hub socket 3 by the O-ring 11. Accordingly, by the resisting force of the resilient O-ring 11, dislocation of the hub member 5 on the main body 2 can be prevented securely enough for ensuring operational reliability of the operation of the atomizing head 1.

Further, since the hub member 5 is resiliently retained in the recessed hub socket 3 through the O-ring 11, the center axis of the hub member 5 can be automatically brought into alignment with the rotational axis of the main body 2 when the rotary atomizing head 1 is put in high speed rotation. That is to say, the hub member 5 can be automatically urged into a concentrically aligned position on the main body 2 of the rotary atomizing head. Therefore, when reassembled, the rotary atomizing head assembly 1 can be readily operated in a rotationally balanced state without readjustments in rotational balances. The omission of readjustments of rotational balances will lead to considerable improvements in assembling and reassembling efficiencies.

Moreover, the O-ring 11, which consists of an ordinary commercially available resilient ring, can be easily replaced whenever it gets deteriorated or damaged, permitting to maintain originally intended performance quality constantly at low cost.

Figure 4:
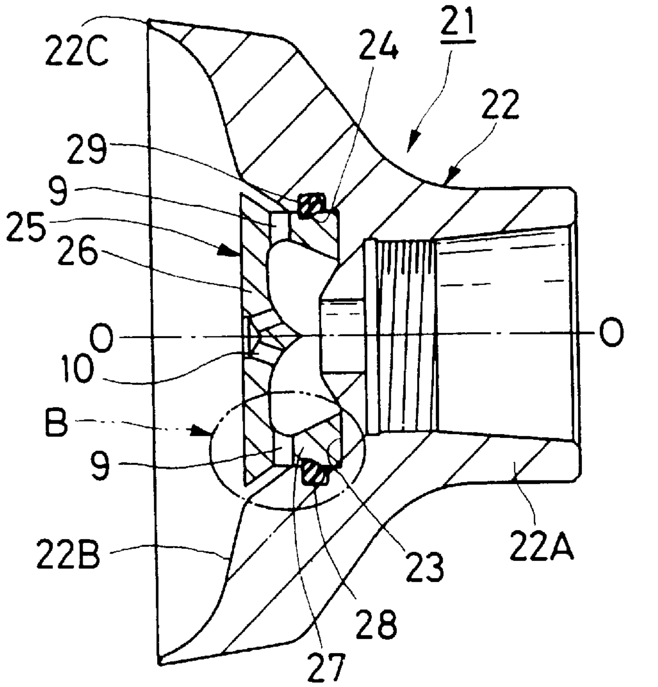
FIG. 4 is a sectional view of a rotary atomizing head assembly adopted as a second embodiment of the invention.
Figure 5:
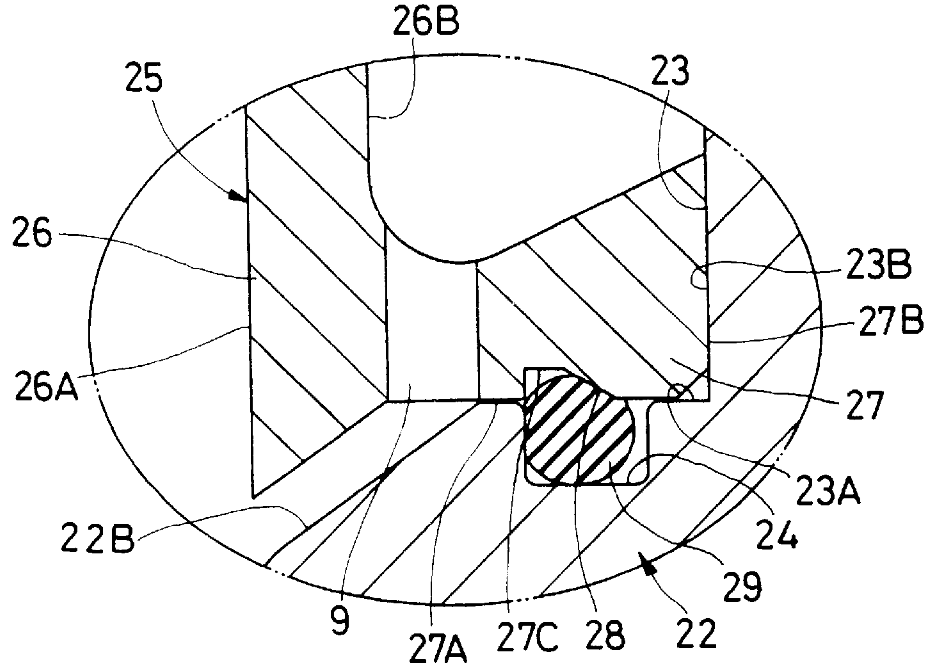
FIG. 5 is an enlarged sectional view of a portion indicated by arrow B in FIG. 4.

Referring to FIGS. 4 and 5, there is shown a second embodiment of the invention, with features in provision of an O-ring which is provided on the part of a recessed hub socket on the main body of the rotary atomizing head. In the following description, those component parts which have corresponding counterparts in the foregoing first embodiment are simply designated by corresponding reference numerals without repeating the same descriptions.

In these figures, indicated at 21 is a rotary atomizing head assembly according to this embodiment, which is constituted by a main body 22, a hub member 25 and an O-ring 29 as will be described below.

Indicated at 22 is a main body having a rotational center axis o—o, which defines the outer configuration of the rotary atomizing head 21, and indicated at 23 is a recessed hub socket which is internally provided with the main body 22 concentrically around a rotational center axis O—O.

In this instance, similarly to the main body 2 in the foregoing first embodiment, the main body 22 of the rotary atomizing head is formed in a bell-shape as a whole, including a rear neck portion 22A to be mounted on a rotational shaft and a paint film forming surface 22B formed on and around the inner periphery of a front portion terminating with paint releasing edges 22C at its foremost end.

As shown in FIG. 5, the recessed hub socket 23 is in the shape of a blind cave which is open only on the front side and defined by an inner peripheral surface 23A and a bottom surface 23B substantially in the same manner as the recessed hub socket 3 of the foregoing first embodiment. However, the recessed hub socket 23 of this embodiment differs from the counterpart in the first embodiment in that it is provided with a ring fitting groove 24 on its inner periphery 23A as will be described below.

Namely, the ring fitting groove 24 is formed in an annular shape on and around the inner periphery 23A of the recessed hub socket 23 and in a confronting position relative to a ring engaging surface 28 which will be described hereafter. The ring fitting groove 24 is open in radially inward directions. Placed in the ring fitting groove 24 is an O-ring 29 which will also be described later.

If Denoted at 25 is a hub member which is provided on the main body 22 of the rotary atomizing head concentrically around the rotational center axis O—O. Similarly to the hub member 5 of the first embodiment, the hub member 25 is generally in the form of a lidded cylinder including a substantially flat plate-like lid portion 26 located at the fore end of a cylindrical body portion 27 which is extended rearward contiguously from the circumference of the lid member 26.

In this case, the lid portion 26 is provided with a flat front face 26A on its front side and a paint receiving surface 26B on its rear side. The afore-mentioned cylindrical body portion 27 is generally in the form of a hollow cylinder including an outer periphery 27A to be fitted in the inner periphery 23A of the recessed hub socket 23, and a rear end face 27B to be abutted against the bottom surface 23B of the recessed hub socket 23. Further, an annular groove 27C of reduced diameter is formed around the outer periphery 27A of the cylindrical body portion 27 in confronting relation with the ring fitting groove 24.

Indicated at 28 is the ring engaging surface which is provided on the outer periphery 27A of the cylindrical body portion 27, the ring engaging surface 28 being in the form of an inclined or beveled surface gradually diverging in the rearward direction (toward the rear end face 27B) and interconnecting the annular groove 27C and the outer peripheral surface 27A of the cylindrical body portion 27. As a consequence, when pressed against the ring engaging surface 28, the O-ring 29 reacts to push the cylindrical body portion 27 of the hub member 25 against the bottom surface 23b of the recessed hub socket 23 by its resilient force, thereby preventing dislocation of the hub member 25.

The O-ring 29 is a resilient ring which is placed in the ring fitting groove 24 on the inner periphery of the recessed hub socket 23. Similarly to the O-ring 11 in the foregoing first embodiment, the O-ring 29 is formed of a resilient material like rubber into a ring having a body of a circular shape in section.

When the cylindrical body portion 27 of the hub member 25 is pushed into the recessed hub socket 23 on the main body 2 of the rotary atomizing head, the O-ring 29 is squeezed into the ring fitting groove 24 through elastic deformation to permit insertion of the cylindrical body portion 27, and then brought into pressed contact against the ring engaging surface 28 to hold the hub member 25 securely within the recessed hub socket 23 by its resilient force. Further, the O-ring 29, which holds the hub member 25 resiliently within the recessed hub socket 23, contributes to suppress or minimize positional deviations of the hub member 25 relative to the rotational center axis O—O of the main body 22 of the rotary atomizing head.

Even in this embodiment, with the arrangements just described, there can be obtained substantially the same operational performances and effects as in the foregoing first embodiment.

Figure 6:
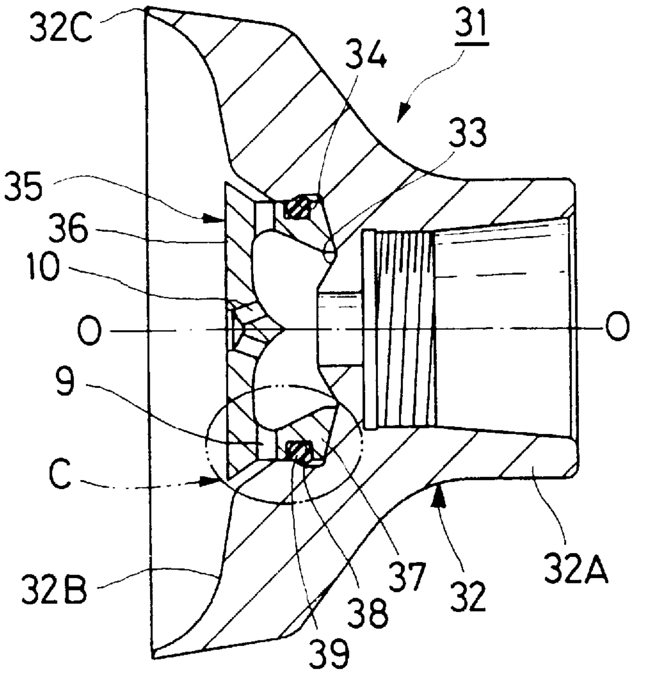
FIG. 6 is a sectional view of a rotary atomizing head assembly adopted as a third embodiment of the invention.
Figure 7:
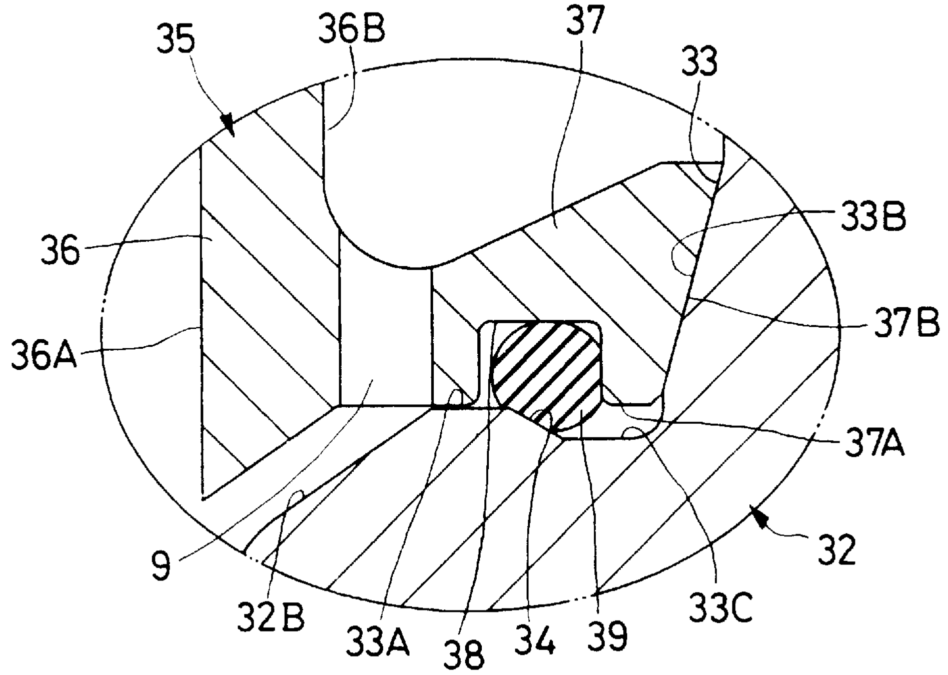
FIG. 7 is an enlarged sectional view of a portion indicated by arrow C in FIG. 6.

Referring now to FIGS. 6 and 7, there is shown a third embodiment of the invention, with features in a recessed hub socket which is provided with a beveled bottom surface and a hub member which is formed with a complementarily inclined beveled surface on the rear end face of its cylindrical body portion for engagement with the beveled bottom surface of the recessed hub socket. In the following description, those component parts which have corresponding counterparts in the foregoing first embodiment are simply designated by corresponding reference numerals without repeating the same explanations.

In these figures, indicated at 31 is a rotary atomizing head assembly of this embodiment, which is constituted by a main body 32, a hub member 35 and an O-ring 39 as will be described in greater detail below.

The main body 32, which defines the outer configuration of the rotary atomizing head 31, is likewise provided with a rotational center axis O—O and a recessed hub socket 33 which is formed on the inner peripheral side of the main body 32 concentrically around the rotational axis O—O.

Similarly to the main body 2 in the first embodiment described above, the main body 32 of the rotary atomizing head is formed in a bell-like shape, including a rear neck portion 32A to be mounted on a rotational shaft and a paint film forming surface 32B which is formed on the inner periphery of its front portion and which is terminated with paint releasing edges 32C at the foremost end thereof.

On the other hand, as shown in FIG. 7, the recessed hub socket 33 is formed in the shape of a blind cave which is open only on the front side and defined by an inner peripheral surface 33A and a bottom surface 33B substantially in the same manner as the recessed hub socket 3 in the above-described first embodiment. Further, the recessed hub socket 33 is provided with an annular groove 33C of increased diameter on and around its inner periphery 33A, along with a ring engaging surface 34 which interconnects the annular groove 33C and the inner peripheral surface 33A. In this embodiment, however, the recessed hub socket 33 is provided with a beveled bottom surface 33B which is inclined rearward toward the rotational axis O—O of the main body 32.

The hub member 35 is fitted in the main body 32 of the rotary atomizing head concentrically around the rotational axis O—O. Similarly to the hub member 5 of the first embodiment, the hub member 35 is formed in the shape of a lidded cylinder including a substantially flat plate-like lid portion 36 which is located at its fore end and a cylindrical body portion 37 contiguously extended in a rearward direction from the circumference of the lid portion 36.

In this case, the lid portion 36 is provided with a flat front face 36A on its front side and formed with a paint receiving surface 36B on its rear side. The cylindrical body portion 37 is generally in the shape of a hollow cylinder which is defined by an outer peripheral surface 37A and a rear end face 37B, substantially in the same manner as the cylindrical body portion 7 of the above-described first embodiment. Formed on and around the outer periphery 37 is a ring fitting groove 38 to receive an O-ring 39 which will be described hereinlater. In this embodiment, however, the cylindrical body portion 37 is provided with a beveled end face 37B which is inclined rearward toward the rotational axis O—O of the hub member 35 complementarily to the beveled bottom surface 33B of the recessed hub socket 33.

The O-ring is a resilient ring which is placed in the ring fitting groove 38. Similarly to the O-ring 11 of the first embodiment, the O-ring 39 is formed of a resilient material like rubber into a ring having a body of a circular shape in section.

When the cylindrical body portion 37 of the hub member 35 is pushed into the recessed hub socket 33 on the main body 32, the O-ring 39 in the ring fitting groove 38 is forcibly squeezed into the groove 38 through elastic deformation to permit insertion of the cylindrical body portion 37 into the recessed hub socket 33, and then brought into pressed contact against the ring engaging surface 34 so that the cylindrical body portion 37 of the hub member 35 is pushed inward of and its dislocation out of the recessed hub socket 33 is securely prevented by resilient resistive force of the O-ring 39.

In this instance, the beveled rear end face 37B of the cylindrical body portion 37 is pressed against the opposing beveled bottom surface 33B of the recessed hub socket 33 as the cylindrical body portion 37 of the hub member 35 is pushed inward of the recessed hub socket 33 by the pressure of the O-ring 39. Accordingly, the beveled rear end face 37B is oriented toward the rotational axis (the axis O—O) of the main body 32, and the hub member 35 is automatically located in a position in alignment with the rotational center axis of the main body 32 through a self-centering mechanism.

In addition to operational performances and effects substantially same as in the foregoing embodiments, this particular embodiment, with the arrangements just described, has features in the provision of the recessed hub socket 33 with the beveled bottom surface 33B which is inclined toward the rotational center axis of the main body 32 for engagement with the beveled rear end face 37B of the cylindrical body portion 37 which is inclined complementarily toward the rotational axis of the hub member 35.

Therefore, when the cylindrical body portion 37 of the hub member 35 is fitted into the recessed hub socket 33 of the main body 32 of the rotary atomizing head to bring the beveled rear end face 37B of the cylindrical body portion 37 into abutting engagement with the beveled bottom surface 33B of the recessed hub socket 33, the hub member 35 is oriented toward the rotational center axis of the main body 32 by engagement of the beveled rear end face 37B. As a result, the hub member 35 is automatically set in a concentrically aligned position relative to the main body 32 through a self-centering mechanism.

Therefore, as the hub member 35 is pressed against the recessed hub socket 33 by the resilient O-ring 39, the cylindrical body portion 37 is automatically urged into a position at the center (on the axis O—O) of the recessed hub socket 33.

As a result, in case the main body 32 and the hub member 35 are reassembled after being once disassembled for a cleaning purpose or the like, it becomes possible to set the rotary atomizing head assembly 31 readily in a rotationally balanced state even if readjustments of rotational balances are omitted. It follows that the jobs of disassembling and reassembling the rotary atomizing head 31 become extremely simple.

Figure 8:
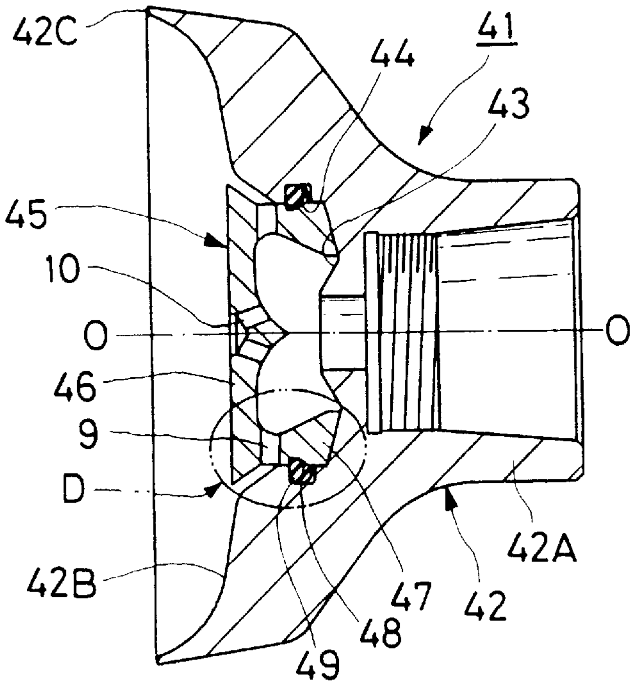
FIG. 8 is a sectional view of a rotary atomizing head assembly adopted as a fourth embodiment of the invention.
Figure 9:
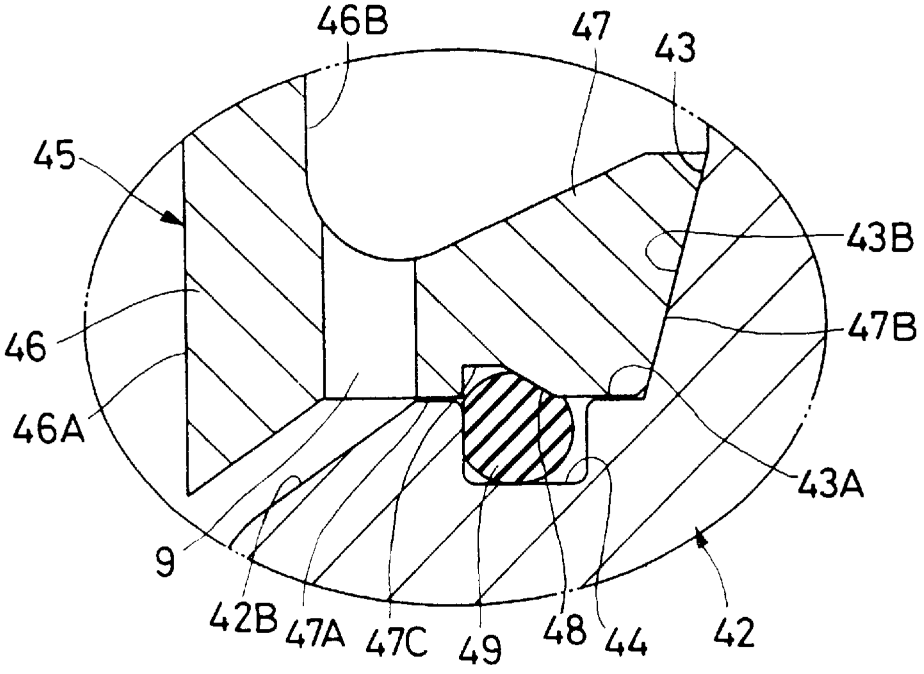
FIG. 9 is an enlarged sectional view of a portion indicated by arrow D in FIG. 8.

Referring to FIGS. 8 and 9, there is shown a fourth embodiment of the invention, with features in a beveled surface at the bottom of the recessed hub socket, a complementary beveled surface on the rear end face of the hub member, and an O-ring which is provided on the part of the recessed hub socket. In the following description of the fourth embodiment, those component parts which have corresponding counterparts in the foregoing first embodiment are simply designated by corresponding reference numerals without repeating the same explanations.

In these figures, indicated at 41 is a rotary atomizing head assembly of this embodiment which is constituted by a main body 42, a hub member 45 and an O-ring 49 as will be described in greater detail below.

The main body 42 which determines the outer configuration of the rotary atomizing head 41 is provided with a rotational center axis O—O and formed with a recessed hub socket 43 on its inner peripheral side concentrically around the rotational axis O—O.

In this instance, similarly to the main body 2 in the first embodiment, the main body 42 of the rotary atomizing head assembly is formed in a bell-like shape as a whole, including a rear neck portion 42A to be mounted on a rotational shaft and a paint film forming surface 42B which is formed on the inner periphery of its front portion terminating with paint releasing edges 42C at its foremost end.

Further, as shown in FIG. 9, the recessed hub socket 43 is formed in the shape of a blind cave which is open only on the front side and defined by an inner peripheral surface 43A and a beveled bottom surface 43B substantially in the same manner as the recessed hub socket 33 of the above-described third embodiment. In this case, however, the recessed hub socket 43 differs from the counterpart in the third embodiment in that it is formed with an inwardly opened ring fitting groove 44 on and around its inner periphery 43A.

The hub member 45 is located within the main body 42 in a concentrically aligned position relative to the rotational axis O—O, and in the form of a lidded cylinder having a flat plate-like lid portion 46 which is located at its fore end and a cylindrical body portion 47 which is extended rearward contiguously from the circumference of the lid portion 46.

In this case, the lid portion 46 is provided with a flat face 46A on its front side and with a paint receiving surface 46B on its rear side. The cylindrical body portion 47 is formed in a cylindrical shape including circumferential surface 47A and a beveled rear end face 47B substantially in the same manner as the cylindrical body portion 37 in the above-described third embodiment. However, the cylindrical body portion 47 of this embodiment differs from the counterpart in the third embodiment in that it is provided with an annular groove 47C of reduced diameter, which is formed around its circumferential surface 47A in confronting relation with the ring fitting groove 44, and a ring engaging surface 48 is formed between the annular groove 47C of reduced diameter and the circumferential surface 47A.

The O-ring 49 is a resilient ring which is placed in the ring fitting groove 44 and which is formed of a resilient material like rubber into a ring of a circular shape in section similarly to the O-ring 11 of the first embodiment.

In this embodiment employing the arrangements just described, there can be obtained substantially the same operational performance and effects as in the foregoing third embodiment.

Figure 10:
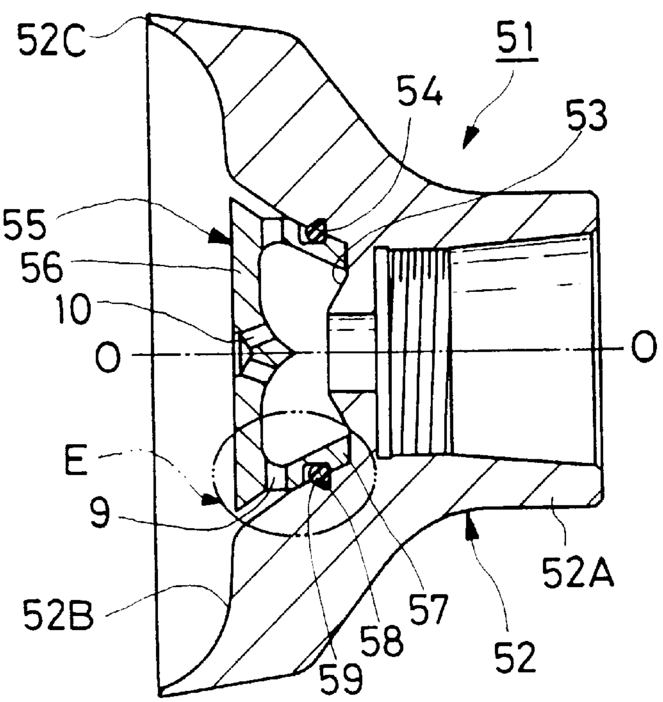
FIG. 10 is a sectional view of a rotary atomizing head assembly adopted as a fifth embodiment of the invention.
Figure 11:
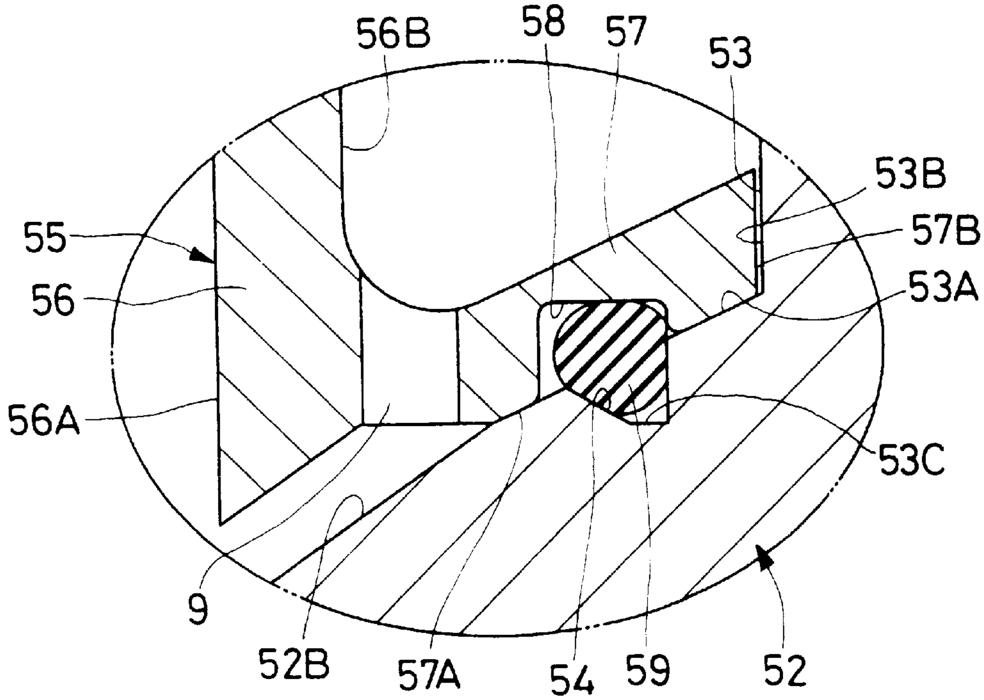
FIG. 11 is an enlarged sectional view of a portion indicated by arrow E in FIG. 10.

Referring now to FIGS. 10 and 11, there is shown a fifth embodiment of the invention, with features in a beveled surface on the inner periphery of the recessed hub socket and a complementarily beveled surface on the opposing circumferential surface of the cylindrical body portion of the hub member. In the following description of the fifth embodiment, those component parts which have corresponding counterparts in the above-described first embodiment are simply designated by corresponding reference numerals without repeating the same explanations.

In these figures, indicated at 51 is a rotary atomizing head assembly of this embodiment, which is constituted by a main body 52, a hub member 55 and an O-ring 59.

The main body 52 which defines the outer configuration of the rotary atomizing head assembly 51 is provided with a center axis O—O and formed with a recessed hub socket 53 on its inner peripheral side concentrically around the center axis O—O.

In this instance, similarly to the main body 2 in the first embodiment, the main body 52 of this embodiment is formed in a bell-like shape as a whole, including a rear neck portion 52A to be mounted on a rotational shaft, and a paint film forming surface 52B formed on and around the inner periphery of its front portion terminating with paint releasing edges 52C at the foremost end thereof.

As shown in FIG. 11, the recessed hub socket 53 is in the shape of a blind cave which is open only on the front side and defined by an inner peripheral surface 53A and a bottom surface 53B substantially in the same manner as the recessed hub socket 33 in the foregoing third embodiment. An annular groove of increased diameter is formed around the inner peripheral surface 53A, along with a ring engaging surface 54 which interconnects the annular groove 53C and the inner peripheral surface 53A. In this embodiment, however, the recessed hub socket 53 is provided with a beveled surface 53A on its inner periphery, which is inclined toward the rotational center axis O—O of the main body 52.

The hub member 55 is fitted on the main body 52 of the rotary atomizing head in a concentrically aligned position relative to the center axis O—O and, similarly to the hub member 5 of the first embodiment, is in the form of a lidded cylinder including a flat plate-like lid portion 56 which is located at its fore end and a cylindrical body portion 57 which is extended rearward contiguously from the circumference of the lid portion 56.

In this case, the lid portion 56 is provided with a flat surface 56A on the front side and a paint receiving surface 56B on the rear side. The cylindrical body portion 57 is formed generally in a cylindrical shape which is defined by an outer peripheral surface 57A and a rear end face 57 substantially in the same manner as the cylindrical body portion 7 in the above-described first embodiment. Formed on the outer peripheral surface 57A is a ring fitting groove 58 to receive the O-ring 59 which will be described later. In this embodiment, however, the cylindrical body portion 57 of the hub member 55 is provided with a beveled surface 57A on its outer periphery which is inclined toward the rotational center axis O—O at a complementarily to the beveled surface 53A on the inner periphery of the recessed hub socket 53.

The O-ring 59 which is placed in the ring fitting groove 58 is a resilient ring which is formed of a resilient material like rubber into a ring having a body of a circular shape in section.

Even in this embodiment, with the arrangements just described, there can be obtained operational performances and effects substantially same as in the foregoing embodiments of the invention. Especially, in the present embodiment, the recessed hub socket 53 is provided with the beveled surface 53A on the inner periphery, which is inclined toward the rotational center axis of the main body 52, for engagement with the complementarily inclined beveled surface 57A on the outer periphery of the cylindrical body portion 57 of the hub member 55.

Accordingly, as the cylindrical body portion 57 of the hub member 55 is fitted into the recessed hub socket 53 of the main body 52, the beveled surface 57A on the outer periphery of the cylindrical body portion 57 is brought into abutting engagement with the beveled surface 53A on the inner periphery of the recessed hub socket 53 to orient the hub member 55 toward the rotational center axis of the main body 52 under the guidance of the beveled surface 57A on its outer periphery. This provides a self-centering mechanism for the hub member 55 on the main body 52 of the rotary atomizing head assembly.

Therefore, upon pressing the hub member 55 into the recessed hub socket 53 by the O-ring 59, the cylindrical body portion 57 is automatically positioned at the center of the recessed hub socket 53 (in alignment with the axis O—O).

Consequently, even in case the rotary atomizing head assembly 51 is reassembled after the main body 52 and the hub member 55 are once disassembled for cleaning or other purposes, the rotary atomizing head assembly 51 can readily restore its rotational balances without necessitating readjustments in this aspect, contributing to improve the facility and efficiency of disassembling and assembling jobs to a significant degree.

Figure 12:
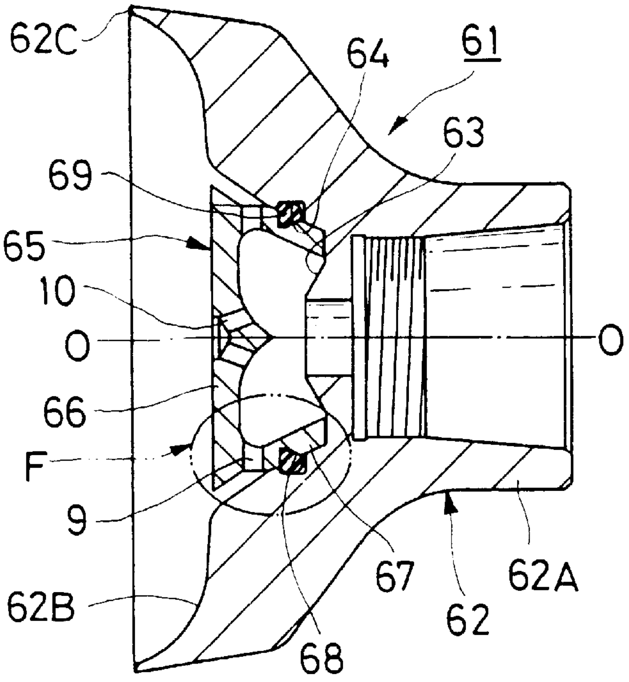
FIG. 12 is a sectional view of a rotary atomizing head assembly adopted as a sixth embodiment of the invention.
Figure 13:
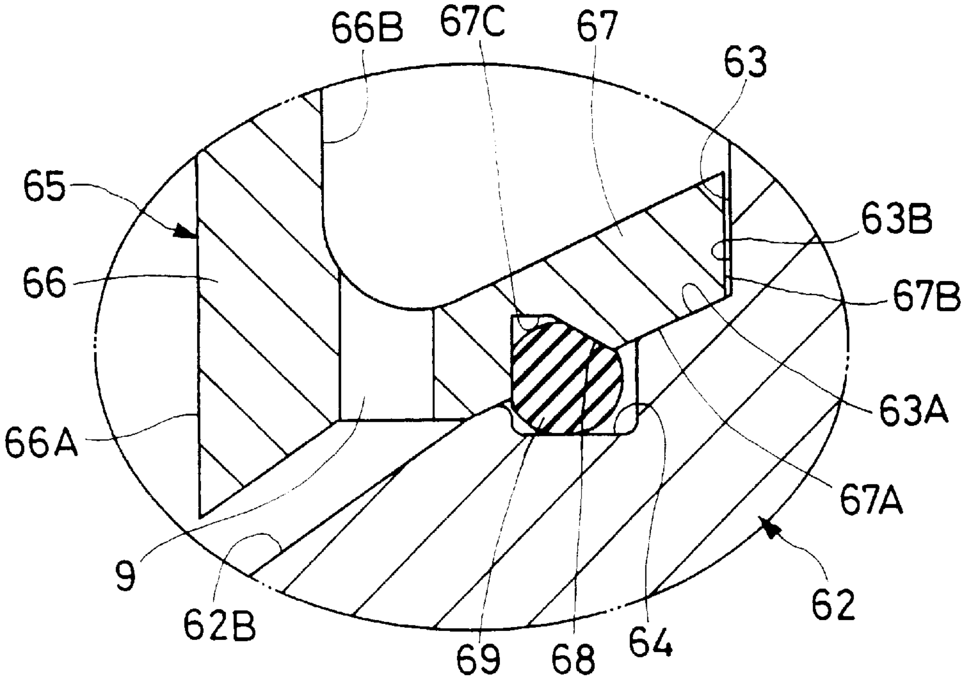
FIG. 13 is an enlarged sectional view of a portion indicated by arrow F in FIG. 12.

Referring to FIGS. 12 and 13, there is shown a sixth embodiment of the invention, with features in a beveled surface which is provided on the inner periphery of the recessed hub socket, a beveled surface which is provided complementarily on the outer periphery of the cylindrical body portion of the hub member, and an O-ring which is provided on the part of the recessed hub socket. In the following description of the sixth embodiment, those component parts which have corresponding counterparts in the above-described first embodiment are simply designated by corresponding reference numerals without repeating the same explanations.

In these figures, indicated at 61 is a rotary atomizing head assembly of this embodiment, which is constituted by a main body 62, a hub member 65 and an O-ring 69 as will be described below.

The main body 62 which defines the outer configuration of the rotary atomizing head assembly 61 is provided with a center axis O—O and formed with a recessed hub socket 63 on its inner peripheral side concentrically around the center axis O—O.

In this case, similarly to the main body 2 of the first embodiment, the main body 62 of this rotary atomizing head assembly is formed in a bell-like shape as a whole, including a rear neck portion 62A to be mounted on a rotational shaft and a paint film forming surface 62B which is provided on the inner periphery of its front portion terminating with paint releasing edges 62C at the foremost end thereof.

As shown in FIG. 13, the recessed hub socket 63 is in the form of a blind cave which is open only on the front side and defined by a beveled inner peripheral surface 63A and a bottom surface 63B substantially in the same manner as the recessed hub socket 53 of the foregoing fifth embodiment. However, the recessed hub socket 63 differs from the counterpart of the fifth embodiment in that it is formed with an inwardly opened ring fitting groove 64 on the beveled surface 63A on its inner periphery.

The hub member 65 is mounted on the main body 62 of the rotary atomizing head concentrically around the center axis O—O, and, similarly to the hub member 5 of the first embodiment, is in the form of a lidded cylinder including a flat plate-like lid portion 66 and a cylindrical body portion 67 which is extended rearward contiguously from the circumference of the lid portion 66.

In this instance, the lid portion 66 is likewise provided with a flat face 66A on its front side and a paint receiving surface 66B on its rear side. The cylindrical body portion 67 is generally in a cylindrical shape which is defined by a beveled outer peripheral surface 67A and a rear end face 67B substantially in the same manner as the cylindrical body portion 57 in the foregoing fifth embodiment. However, the cylindrical body portion 67 of this embodiment differs from the counterpart of the fifth embodiment in that it is formed with an annular groove 67C of reduce diameter on its beveled outer peripheral surface 67A in confronting relation with the ring fitting groove 64, and with a ring engaging surface 68 which interconnects the reduced-diameter annular groove 67C and the beveled outer peripheral surface 67A.

The O-ring 69 is a resilient ring which is placed in the ring fitting groove 64 and, similarly to the O-ring 11 of the first embodiment, formed of a resilient material like rubber into a ring having a body of a circular shape in section.

Even in this embodiment with the arrangements just described, there can be obtained substantially the same operational performances and effects as in the foregoing fifth embodiment of the invention.

Figure 14:
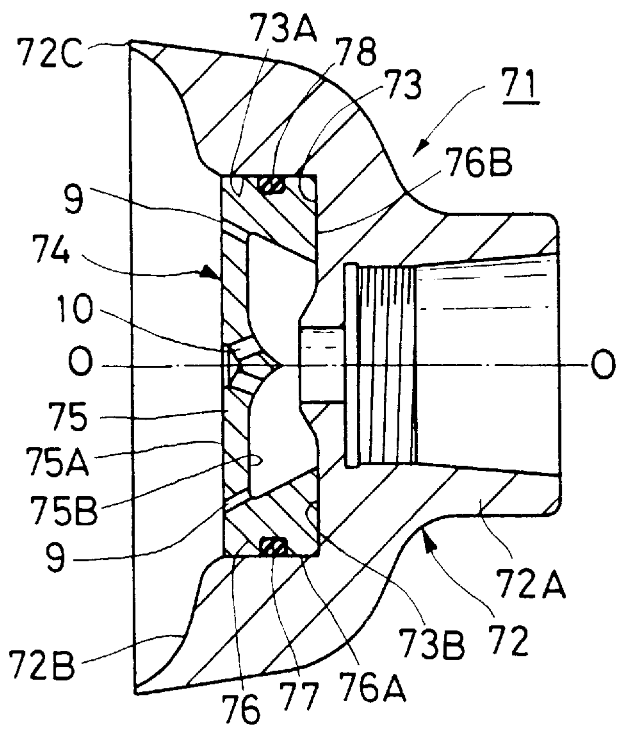
FIG. 14 is a sectional view of a rotary atomizing head assembly adopted as a seventh embodiment of the invention.

Referring now to FIG. 14, there is shown a seventh embodiment of the invention, with features in arrangements which can prevent dislocation of the hub member out of the recessed hub socket solely by a resilient force of an O-ring. In the following description of the seventh embodiment, those component parts which have corresponding counterparts in the above-described first embodiment are simply designated by corresponding reference numerals without repeating the same explanations.

In this figure, indicated at 71 is a rotary atomizing head assembly of this embodiment, which is constituted by a main body 72, a hub member 74 and an O-ring 78.

The main body 72 which defines the outer configuration of the rotary atomizing head assembly is provided with a center axis O—O and a recessed hub socket 73 which is formed on its inner peripheral side concentrically around the center axis O—O of the main body 72 of the rotary atomizing head assembly.

In this instance, similarly to the main body 2 of the first embodiment, the main body 72 of the rotary atomizing head assembly in this embodiment is generally formed in a bell-like shape including a rear neck portion 72A to be mounted on a rotational shaft, and a paint film forming surface 72B formed on the inner periphery of its front portion terminating with paint releasing edges 72C at the foremost end thereof.

The recessed hub socket 73 is in the form of a blind cave which is open only on the front side and defined by an inner peripheral surface 73A and a bottom surface 73B substantially in the same manner as the recessed hub socket 3 in the above-described first embodiment.

The hub member 74 is mounted on the main body 72 of the rotary atomizing head in a concentrically aligned position relative to the center axis O—O. Similarly to the counterpart 5 in the first embodiment, the hub member 74 is formed in the shape of a lidded cylinder including a substantially flat plate-like lid portion 75 and a cylindrical body portion 76 which is extended rearward from the circumference of the lid portion 75.

In this instance, the lid portion 75 is provided with a flat front face 75A on its front side and a paint receiving surface 75B on its rear side. The cylindrical body portion 76 of the hub member 74 is formed in a cylindrical shape which is defined by an outer peripheral surface 76A and a rear end face 76B substantially in the same manner as the cylindrical body 7 in the above-described first embodiment. Formed on the outer peripheral surface 76A is a ring fitting groove 77 which receives the O-ring 78 as will be described below.

The O-ring 78 in the ring fitting groove 77 on the outer periphery of the cylindrical body portion 76 is a resilient ring which is formed of rubber or a similar resilient material into a ring having a body of a circular shape in section similarly to the O-ring 11 in the first embodiment.

As the cylindrical body portion 76 of the hub member 74 is pushed into the recessed hub socket 73, the O-ring 78 is squeezed into the ring fitting groove 77 through elastic deformation to permit insertion of the cylindrical body portion 76 into the hub socket 73 and at the same time fixedly holding the hub member 74 within the hub socket 73 by its resilient resistive (or frictional) force acting on the inner periphery of the recessed hub socket 73.

Even in this embodiment, with the arrangements just described, there can be obtained substantially the same operational performances and effects as in the foregoing respective embodiments of the invention.

Figure 15:
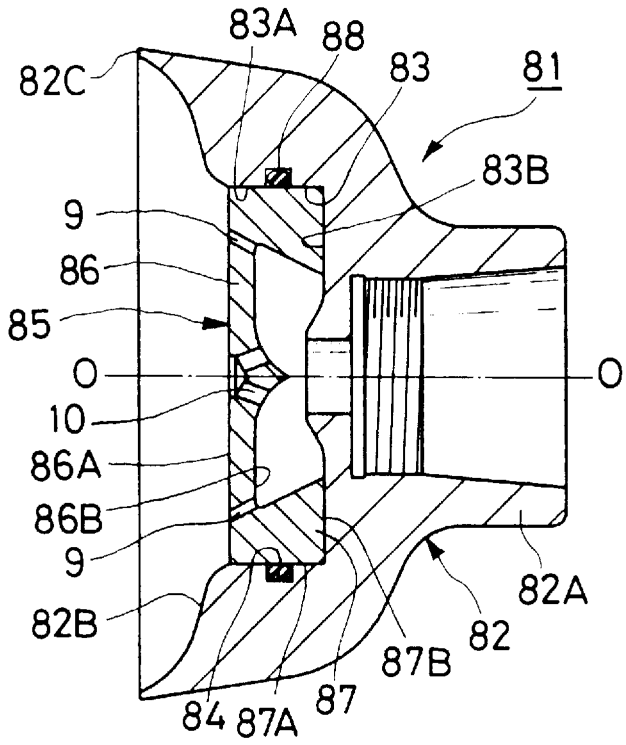
FIG. 15 is a sectional view of a rotary atomizing head assembly adopted as an eighth embodiment of the invention.
Figure 16:
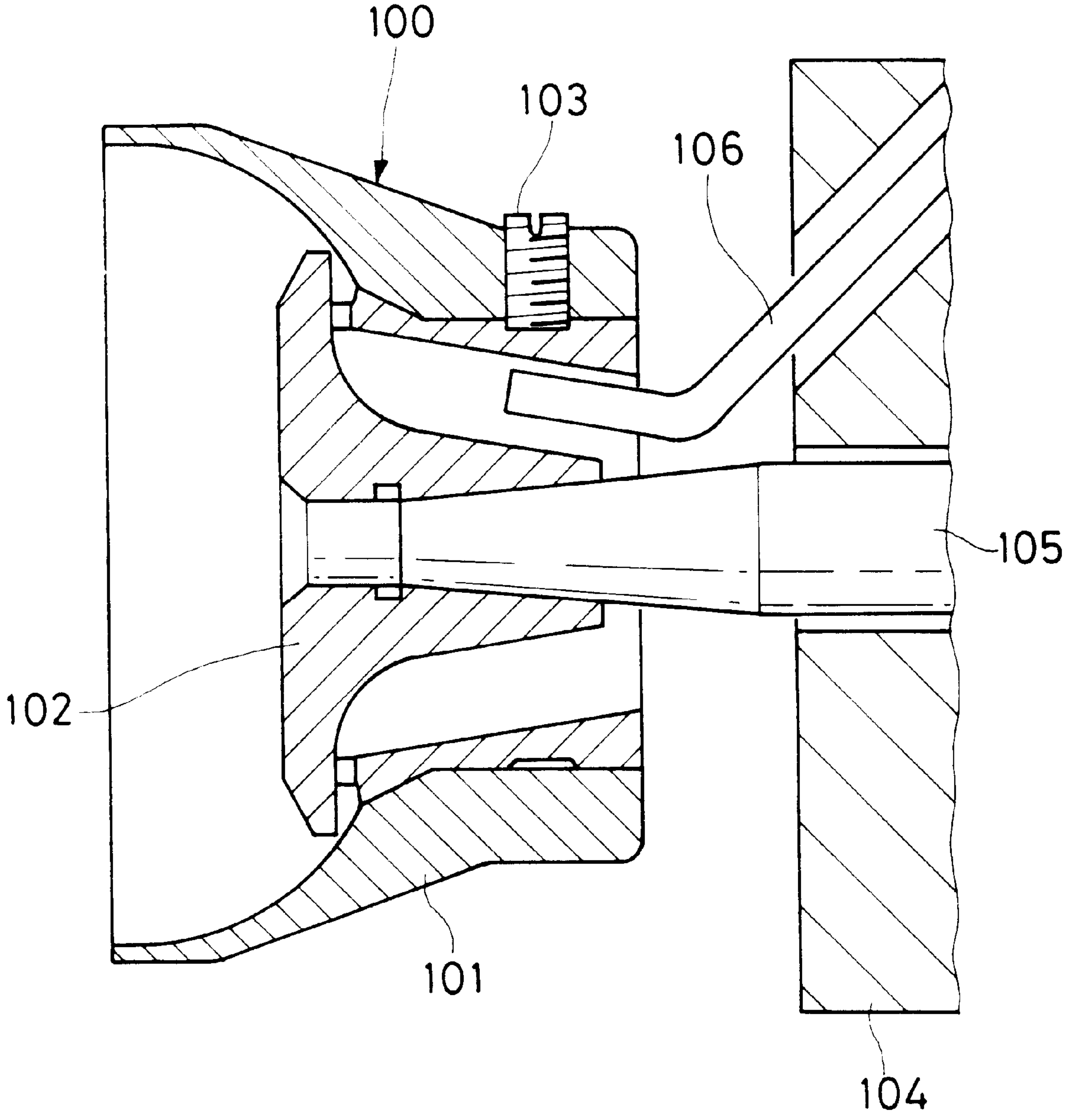
Fig.16 PRIOR ART
FIG. 16 is a sectional view of a first prior art rotary atomizing head.
Figure 17:
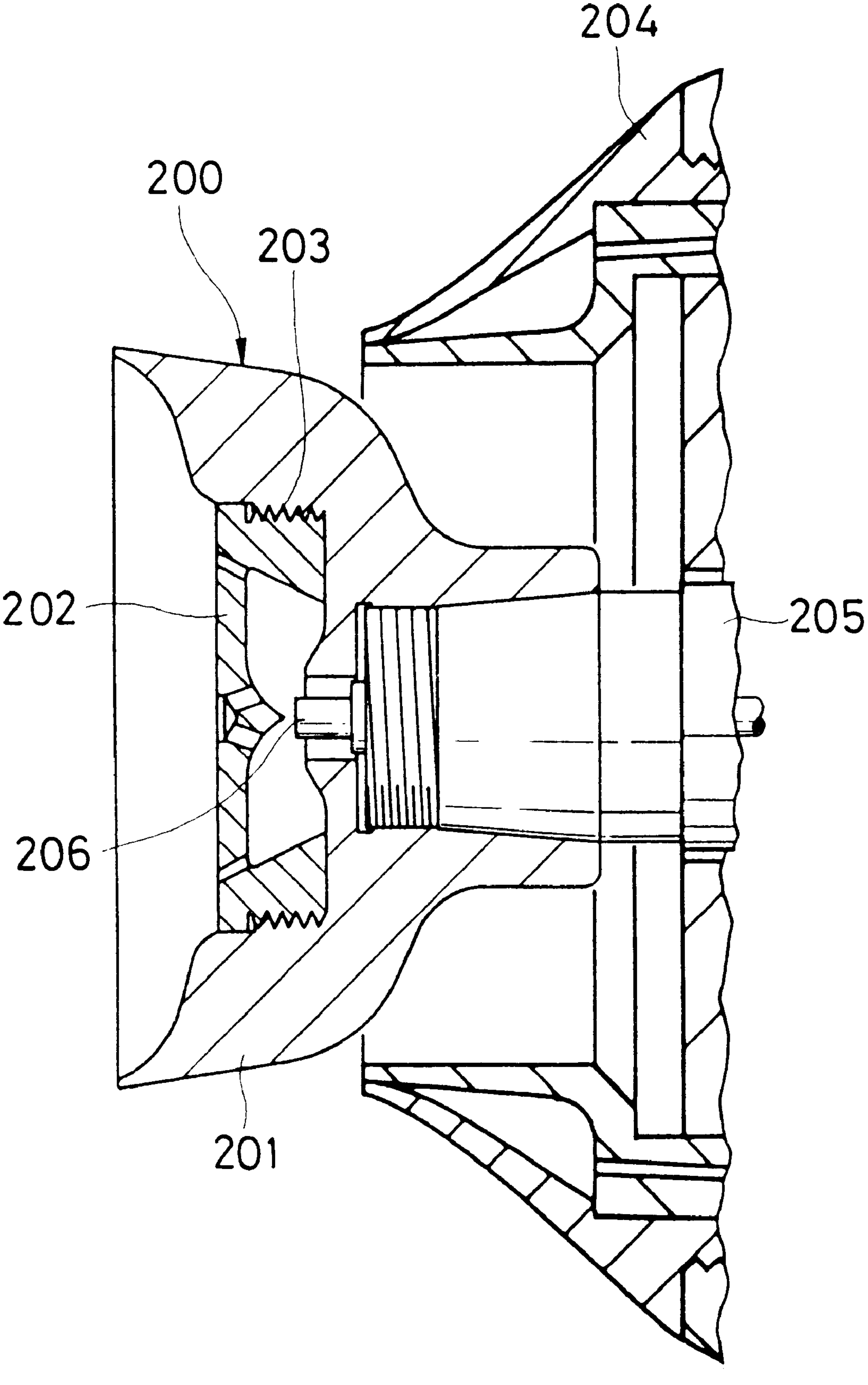
Fig.17 PRIOR ART
FIG. 17 is a sectional view of a second prior art rotary atomizing head.

Referring now to FIG. 15, there is shown an eighth embodiment of the invention, with features in arrangements which can prevent dislocation of the hub member out of the recessed hub socket solely by a resilient resistive force of an O-ring which is set in a ring fitting groove provided on the part of the recessed hub socket. In the following description of the eighth embodiment, those component parts which have corresponding counterparts in the above-described first embodiment are simply designated by corresponding reference numerals without repeating the same explanations.

In that figure, indicated at 81 is a rotary atomizing head assembly of this embodiment, which is constituted by a main body 82, a hub member 85 and an O-ring which will be described below.

The main body 82 which defines the outer configuration of the rotary atomizing head 81 is provided with a center axis O—O and formed with a recessed hub socket 83 on its inner peripheral side concentrically around the center axis O—O.

In this instance, similarly to the main body 2 in the above-described first embodiment, the main body 82 of this embodiment is generally formed in a bell-like shape having a rear neck portion 82A to be mounted on a rotational shaft and a paint film forming surface 82B formed on the inner periphery of its front portion terminating with paint releasing edges 82C at the foremost end thereof.

The recessed hub socket 83 is in the form of a blind cave which is open only on the front side and defined by an inner peripheral surface 83A and a bottom surface 83B substantially in the same manner as the recessed hub socket 3 in the above-described first embodiment. However, the recessed hub socket 83 of this embodiment differs from the counterpart 3 in the seventh embodiment in that it is formed with a ring fitting groove 84 on its inner peripheral surface 83A to receive the O-ring 88 which will be described below.

The hub member 85 is mounted on the main body 82 of the rotary atomizing head in a concentrically aligned position relative to the center axis O—O. Similarly to the hub member 5 of the first embodiment, the hub member 85 is formed in the shape of a lidded cylinder including a substantially flat plate-like lid portion 86, which is located at its front end, and a cylindrical body portion 87 which is extended rearward contiguously from the circumference of the lid portion 86.

In this case, the lid portion 86 is likewise provided with a flat front face 86A on its front side and a paint receiving surface 86B on its rear side. The cylindrical body portion 87 is in the form of a cylinder which is defined by an outer peripheral surface 87A and a rear end face 87B substantially in the same manner as the cylindrical body portion 7 in the above-described first embodiment.

The O-ring 88 which is set in the ring fitting groove 84 on the inner periphery 83A of the recessed hub socket 83 is a resilient ring which is formed of rubber or a similar resilient material into a ring having a body of a circular shape in section.

Even in this embodiment, with the arrangements just described, there can be obtained substantially the same performances and effects as in the foregoing respective embodiments of the invention.

Although the O-rings 11, 29, 39, 49, 59, 69, 78 and 88 in the foregoing embodiments have been described as being constituted by a resilient ring of a circular shape in section, they may be substituted by a resilient ring of other sectional shape, for example, of an elliptic or polygonal shape.

Further, in place of the bell-shaped main bodies 2, 22, 32, 42, 52, 62, 72 and 82 of the rotary atomizing head assemblies exemplified in the foregoing embodiments, there may be employed a main body of a cylindrical shape which is increased in diameter toward the foremost paint releasing edges from the rear neck portion to be mounted on a rotational shaft.

INDUSTRIAL APPLICABILITY

As clear from the foregoing detailed description, with the rotary atomizing head assembly according to the present invention, the hub member is allowed to fit into the recessed hub socket on the main body by elastic deformation of the resilient ring in the ring fitting groove between the recessed hub socket and the cylindrical body portion, and then securely retained in position on the main body of the rotary atomizing head by resilient force of the ring.

Accordingly, the present invention makes it possible to assemble and disassemble the main body and hub member of the rotary atomizing head without using any tool which would be usually required in prior art counterparts, contributing to the improvements in assembling and production efficiencies in manufacturing processes to a considerable degree. Besides, the easy assembling and disassembling makes it possible to accomplish cleaning of the rotary atomizing head assembly in an extremely efficient manner.

Further, once the cylindrical body portion of the hub member is fitted in the recessed hub socket on the main body of the rotary atomizing head until the resilient ring comes into pressed contact with the ring engaging surface, the hub member is stopped in position securely enough to preclude possibilities of its dislocation out of the main body of the rotary atomizing head by the resistive force of the resilient ring, enhancing the reliability of the rotary atomizing head.

Moreover, by holding the cylindrical body portion of the hub member within the recessed hub socket of the main body through the resilient ring, the hub member can be easily brought into alignment with the rotational center axis of the main body of the rotary atomizing head. As a consequence, when reassembling the rotary atomizing head, it can be readily put in a rotationally balanced state without making any readjustments in rotational balances, making assembling and reassembling jobs extremely simple and easy.

We claim:

1. A rotary atomizing head assembly, comprising:

a main body formed in a cylindrical or bell-like shape including a rear neck portion to be mounted on a rotational shaft, a front portion having a paint film forming surface on the inner periphery thereof toward fore paint releasing edges, and a recessed hub socket formed in the depths of said paint film forming surface;

a hub member in the form of a lidded cylinder including a lid portion having a paint receiving surface on the rear side thereof, a cylindrical body portion extending rearward from said lid portion and detachably fitted in said recessed hub socket, and paint outlet holes for letting a paint flow out to said paint film forming surface of said main body from said paint receiving surface;

a ring fitting groove provided on one of two opposing surfaces of an inner peripheral surface of said recessed hub socket on said main body and an outer peripheral surface of said hub member;

a resilient ring placed in said ring fitting groove to hold said hub member detachably in said recessed hub socket by a resilient force when said cylindrical body portion of said hub member is fitted into said recessed hub socket on said main body; and a ring engaging surface provided on the other one of said two opposing surfaces in confronting relation with said ring fitting groove and having an inclined surface engageable with said resilient ring holding said hub member in position within said recessed hub socket.

2. A rotary atomizing head assembly as defined in claim 1, wherein said ring engaging surface is formed between an inner peripheral surface of said recessed hub socket and an annular groove of enlarged diameter formed on the inner periphery surface of said hub socket.

3. A rotary atomizing head assembly as defined in claim 1, wherein said ring engaging surface is formed between an outer peripheral surface of said hub member and an annular groove of reduced diameter formed on the outer periphery surface of said hub member.

4. A rotary atomizing head assembly as defined in claim 1, wherein said recessed hub socket on said main body is provided with a beveled bottom surface inclined toward the rotational axis thereof, while said cylindrical body portion of said hub member is provided with a beveled rear end face inclined complementarily relative to said beveled bottom surface of said recessed hub socket.

5. A rotary atomizing head assembly as defined in claim 1, wherein said recessed hub socket on said main body is provided with a beveled inner peripheral surface inclined toward the rotational axis thereof, while said cylindrical body portion of said hub member is provided with a beveled outer peripheral surface inclined complementarily relative to said beveled inner peripheral surface of said recessed hub socket.

6. A rotary atomizing head assembly as defined in claim 1, wherein said ring fitting groove is provided on an outer peripheral surface of said cylindrical body portion of said hub member, while said ring engaging surface is provided on an inner peripheral surface of said recessed hub socket.

7. A rotary atomizing head assembly as defined in claim 1, wherein said ring fitting groove is provided on an inner peripheral surface of said recessed hub socket on said main body, while said ring engaging surface is provided on an outer peripheral surface of said cylindrical body portion of said hub member.

8. A rotary atomizing head assembly as defined in claim 1, wherein said ring fitting groove is provided on an outer peripheral surface of said cylindrical body portion of said hub member, said ring engaging surface is provided on an inner peripheral surface of said recessed hub socket on said main body, said recessed hub socket on said main body is provided with a beveled bottom surface inclined toward the rotational axis thereof, and said cylindrical body portion of said hub member is provided with a beveled end face inclined complementarily relative to said beveled bottom surface of said recessed hub socket.

9. A rotary atomizing head assembly as defined in claim 1, wherein said ring fitting groove is provided on an inner peripheral surface of said recessed hub socket on said main body, said ring engaging surface is provided on an outer peripheral surface of said cylindrical body portion of said hub member, said recessed hub socket on said main body is provided with a beveled bottom surface inclined toward the rotational axis thereof, and said cylindrical body portion of said hub member is provided with a beveled end face inclined complementarily relative to said beveled bottom surface of said recessed hub socket.

10. A rotary atomizing head assembly as defined in claim 1, wherein said ring fitting groove is provided on an outer peripheral surface of said cylindrical body portion of said hub member, said ring engaging surface is provided on an inner peripheral surface of said recessed hub socket on said main body, said recessed hub socket on said main body is provided with a beveled inner peripheral surface inclined toward the rotational axis thereof, and said cylindrical body portion of said hub member is provided with a beveled outer peripheral surface inclined complementarily relative to said beveled inner peripheral surface of said recessed hub socket.

11. A rotary atomizing head assembly as defined in claim 1, wherein said ring fitting groove is provided on an inner peripheral surface of said recessed hub socket, on said main body, said ring engaging surface is provided on an outer peripheral surface of said hub member, said recessed hub socket or said main body is provided with a beveled inner peripheral surface inclined toward the rotational axis thereof, and said cylindrical portion of said hub member is provided with a beveled outer peripheral surface inclined complementarily relative to said beveled inner peripheral surface of said recessed hub socket.

* * * * *